(12) United States Patent
Matsuura et al.

(10) Patent No.: US 8,590,973 B2
(45) Date of Patent: Nov. 26, 2013

(54) LOCK DEVICE FOR VEHICULAR SEAT

(75) Inventors: Hiroshi Matsuura, Hamamatsu (JP); Hironori Ohba, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 103 days.

(21) Appl. No.: 13/357,090

(22) Filed: Jan. 24, 2012

(65) Prior Publication Data

US 2012/0193966 A1    Aug. 2, 2012

(30) Foreign Application Priority Data

Jan. 31, 2011    (JP) .................................. 2011-017701

(51) Int. Cl.
*B60N 2/015*    (2006.01)
*E05B 15/02*    (2006.01)

(52) U.S. Cl.
USPC ................. 297/378.13; 292/216; 292/341.12; 296/65.17

(58) Field of Classification Search
USPC ............... 297/336, 378.13; 296/65.03, 65.17; 292/216, 341.12, DIG. 56
See application file for complete search history.

(56) References Cited

U.S. PATENT DOCUMENTS

| 4,679,836 | A | * | 7/1987 | Pupillo et al. ................. 292/216 |
| 5,141,270 | A | * | 8/1992 | Shibata ......................... 292/216 |
| 5,727,825 | A | * | 3/1998 | Spurr ........................ 292/341.12 |
| 5,918,918 | A | * | 7/1999 | Mosley ..................... 292/341.12 |
| 6,012,747 | A | | 1/2000 | Takamura et al. |
| 6,283,550 | B1 | * | 9/2001 | Vialatte et al. ................ 297/335 |
| 6,322,114 | B1 | * | 11/2001 | Kurachi et al. .......... 292/341.17 |
| 7,306,269 | B2 | * | 12/2007 | Cetnar et al. .................. 292/216 |
| 7,703,828 | B2 | * | 4/2010 | O'Connor et al. ....... 297/378.13 |
| 8,303,018 | B2 | * | 11/2012 | Zambon et al. ............ 296/65.02 |
| 2009/0026790 | A1 | * | 1/2009 | O'Connor et al. ......... 296/65.03 |

FOREIGN PATENT DOCUMENTS

| JP | 9-268823 A | 10/1997 |
| JP | 10-102864 A | 4/1998 |
| JP | 3576311 B2 | 10/2004 |

* cited by examiner

*Primary Examiner* — Peter Brown
(74) *Attorney, Agent, or Firm* — Foley & Lardner LLP

(57) ABSTRACT

A lock device for a vehicular seat, including a striker and a catcher including a base plate, a cover, a first striker receiving portion formed in each of the base plate and the cover, a latch rotatably disposed through a latch shaft, a lock plate rotatably disposed through a lock shaft, and a rubber bumper mounted to the first striker receiving portion of the base plate. The rubber bumper includes engaging grooves engaged with side peripheries of the first striker receiving portion of the base plate, respectively, a recessed portion engaged with a bumper receiving portion formed on a bottom surface of the first striker receiving portion of the base plate, and restraining portions engageable with outer circumferential surfaces of the latch shaft and the lock shaft, thereby restraining the rubber bumper from falling off from the first striker receiving portion of the base plate.

5 Claims, 6 Drawing Sheets

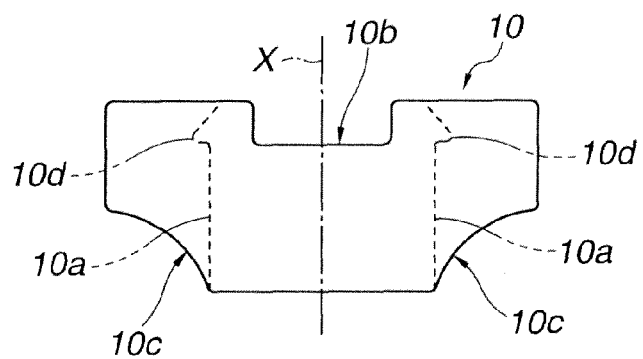
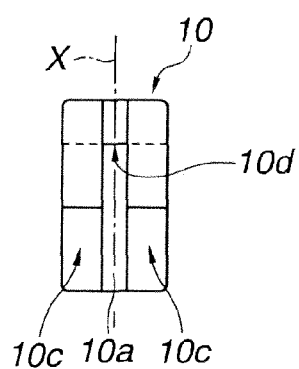
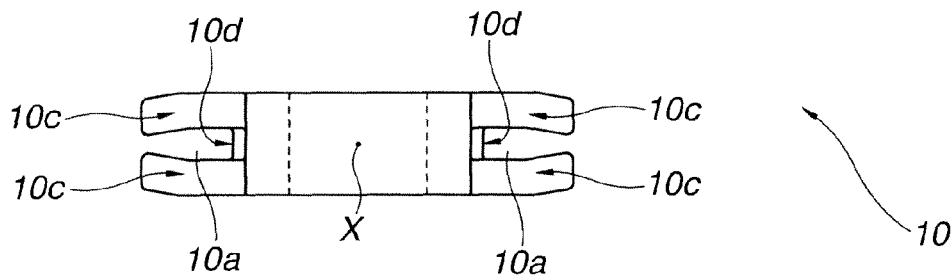
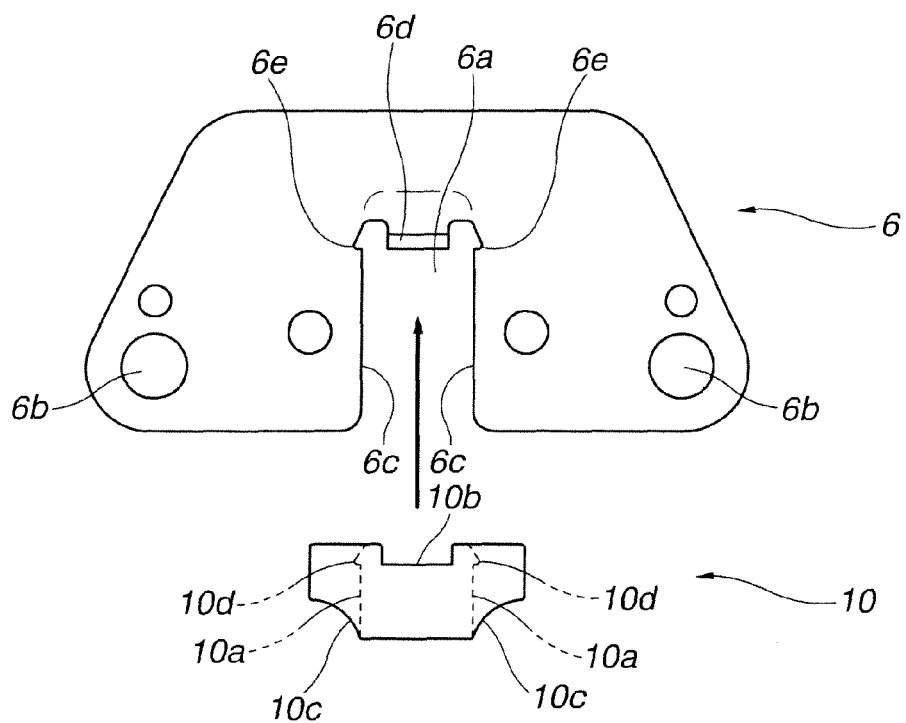

LOCK DEVICE FOR VEHICULAR SEAT

BACKGROUND OF THE INVENTION

The present invention relates to a lock device for a vehicular seat, and specifically to an improved mounting construction of a rubber bumper capable of reducing an impact that occurs when a striker fixed to a vehicle body is engaged in a striker receiving portion disposed on the seat.

A seat disposed inside of a vehicle can be brought into a use position where the seat is allowed to be available to a passenger and a non-use position where the seat is raised up to ensure a loading space of the vehicle. For this purpose, a lock device for a seat is used, with which a seat cushion or a seat back is detachably fixed to the vehicle body.

Japanese Patent Application Unexamined Publication No. 10-102864 discloses a lock device for a vehicular seat. The lock device includes a rubber bumper capable of reducing an impact that occurs when a striker fixed to a vehicle body is engaged in a striker receiving portion disposed on the seat. When the rubber bumper is mounted to a striker receiving groove formed in a cover plate, an engaging groove of the rubber bumper is fitted to a peripheral edge of the striker receiving groove so that the rubber bumper can be restrained from inclining in an axial direction of the striker. Further, an open side of the striker receiving groove has a width smaller than that of a bottom side of the striker receiving groove, so that the rubber bumper can be prevented from falling off from the striker receiving groove.

Japanese Patent No. 3576311 discloses a lock device for a vehicular seat which includes a cover plate having a projecting portion and a rubber bumper having a fitting hole into which the projecting portion of the cover plate is fitted. The rubber bumper can be restrained from being displaced in both an up-and-down direction thereof and a right-and-left direction thereof by the fitting between the projecting portion of the cover plate and the fitting hole of the rubber bumper. The cover plate also has a cutout portion engaged with the rubber bumper. The rubber bumper can be restrained from being displaced in the right-and-left direction thereof by contact between opposed side peripheries of the cutout portion of the cover plate and opposed side surfaces of the rubber bumper. The rubber bumper also has position restraining portions contacted with large-diameter portions of two shafts that are connected with the cover plate. The rubber bumper can be restrained from falling off from the cutout portion of the cover plate by the contact between the position restraining portions and the large-diameter portions of the shafts.

SUMMARY OF THE INVENTION

However, when a large load is exerted on the rubber bumper of the lock device of the former of the above conventional arts, there may occur fall-off of the rubber bumper from the striker receiving groove. Further, since the rubber bumper of the lock device of the latter of the above conventional arts is formed with both the fitting hole and the position restraining portions, the shape of the rubber bumper is complicated and asymmetrical with respect to a central axis of the rubber bumper. For this reason, it is necessary to take into account a direction of the rubber member upon assembling the lock device.

It is an object of the present invention to provide a lock device for a vehicular seat which is capable of solving the above problems of the conventional arts.

In a first aspect of the present invention, there is provided a lock device for a vehicular seat, including: a striker fixed to a vehicle body; and a catcher disposed on the seat, the catcher catching the striker, the catcher including:

a base plate;

a cover cooperating with the base plate to form an accommodating space therebetween;

a first striker receiving portion formed in each of the base plate and the cover such that the striker is permitted to move into and move out from the first striker receiving portion, the first striker receiving portion extending from a substantially intermediate position on one end surface of each of the base plate and the cover toward an inside of the base plate and the cover, a latch rotatably disposed within the accommodating space on one side of the first striker receiving portion through a latch shaft, the latch having a lock position with respect to the striker and an unlock position with respect to the striker, a second striker receiving portion formed in the latch such that the striker received in the first striker receiving portion is permitted to move into and move out from the second striker receiving portion, a lock plate rotatably disposed within the accommodating space on the other side of the first striker receiving portion through a lock shaft, the lock plate having a restraint position in which the lock plate restrains the latch from rotating from the lock position to the unlock position and an allowance position in which the lock plate allows the latch to rotate from the lock position to the unlock position, and a rubber bumper mounted to the first striker receiving portion formed in the base plate, the rubber bumper serving for reducing an impact that occurs when the striker is allowed to move into the first striker receiving portion, wherein the rubber bumper includes:

engaging grooves formed on both sides of the rubber bumper, the engaging grooves being engaged with side peripheries of the first striker receiving portion formed in the base plate, respectively, a recessed portion formed at one end of the rubber bumper which is opposed to a bottom surface of the first striker receiving portion formed in the base plate, the recessed portion being engaged with a bumper receiving portion formed on the bottom surface of the first striker receiving portion formed in the base plate, and restraining portions formed on the both sides of the rubber bumper at the other end of the rubber bumper which is located on a side of an opening of the first striker receiving portion formed in the base plate, the restraining portions being engageable with an outer circumferential surface of the latch shaft and an outer circumferential surface of the lock shaft, thereby restraining the rubber bumper from falling off from the first striker receiving portion formed in the base plate.

In a second aspect of the present invention, there is provided the lock device for a vehicular seat, according to the first aspect as described above, wherein the first striker receiving portion formed in the base plate includes one of a recess and a projection, the one of the recess and the projection being formed on each of the side peripheries of the first striker receiving portion formed in the base plate in the vicinity of the bottom surface of the first striker receiving portion formed in the base plate, and the rubber bumper includes the other of the recess and the projection, the other of the recess and the projection being formed on a bottom surface of each of the engaging grooves formed on the rubber member, the one of the recess and the projection and the other thereof being engaged with each other to fix the rubber bumper into the first striker receiving portion formed in the base plate.

In a third aspect of the present invention, there is provided the lock device for a vehicular seat, according to the first aspect as described above, wherein the engaging grooves of the rubber bumper have bottom surfaces that extend substantially parallel to each other.

In a fourth aspect of the present invention, there is provided the lock device for a vehicular seat, according to the first aspect as described above, wherein the bumper receiving portion of the base plate extends from the bottom surface of the first striker receiving portion formed in the base plate into the first striker receiving portion formed in the base plate, and then extends into the accommodating space between the base plate and the cover in a direction perpendicular to the base plate.

In a fifth aspect of the present invention, there is provided the lock device for a vehicular seat, according to the first aspect as described above, wherein the rubber bumper has a line symmetrical shape with respect to a central axis of the rubber bumper.

BRIEF DESCRIPTION OF THE DRAWINGS

FIG. 1A is a front view of a rubber bumper of a lock device for a vehicular seat, according to an embodiment of the present invention.

FIG. 1B is a bottom plan view of the rubber bumper of the lock device according to the embodiment.

FIG. 1C is a right side view of the rubber bumper of the lock device according to the embodiment.

FIG. 2 is an explanatory diagram showing an operation of assembling the rubber bumper to a base plate of the lock device according to the embodiment.

DETAILED DESCRIPTION OF THE INVENTION

In the following, a lock device for a vehicular seat, according to an embodiment of the present invention will be explained in detail with reference to the accompanying drawings.

[Construction]

Figure 8:
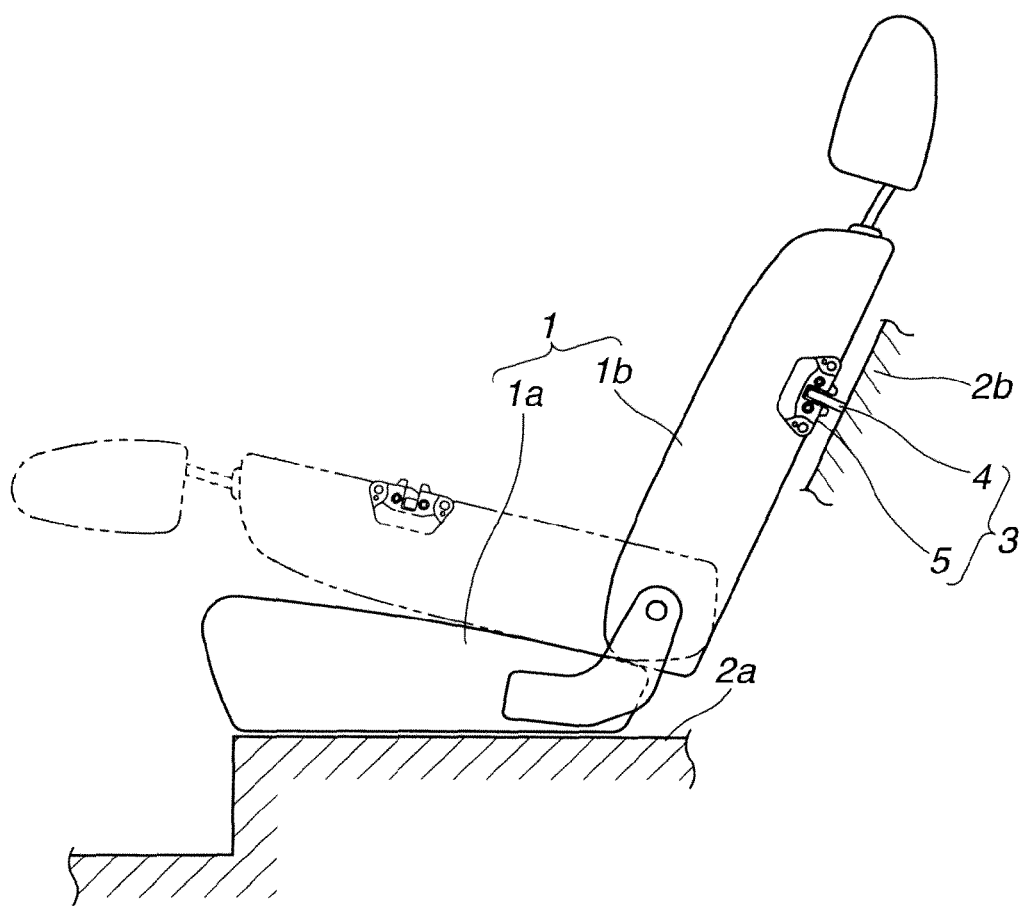
FIG. 8 is a diagram showing the vehicular seat equipped with the lock device according to the embodiment.

Referring to FIG. 8, there is shown a rear seat 1 of a vehicle which is equipped with a lock device 3 according to the embodiment of the present. As shown in FIG. 8, the rear seat 1 includes a seat cushion 1a and a seat back 1b disposed to be rotatable with respect to the seat cushion 1a. The seat cushion 1a is connected to a floor 2a as a part of a vehicle body through bolts, not shown. The seat back 1b is detachably mounted to another part 2b of the vehicle body which is raised up relative to the floor 2a.

The lock device 3 is provided in order to detachably mount the seat back 1b to the part 2b of the vehicle body. The lock device 3 includes a striker 4 and a catcher 5. The striker 4 is a U-shaped rod member having opposed ends that are fixed to the part 2b of the vehicle body. The catcher 5 is embedded in a rear surface of the seat back 1b and constructed to catch and release the striker 4.

Figure 4:
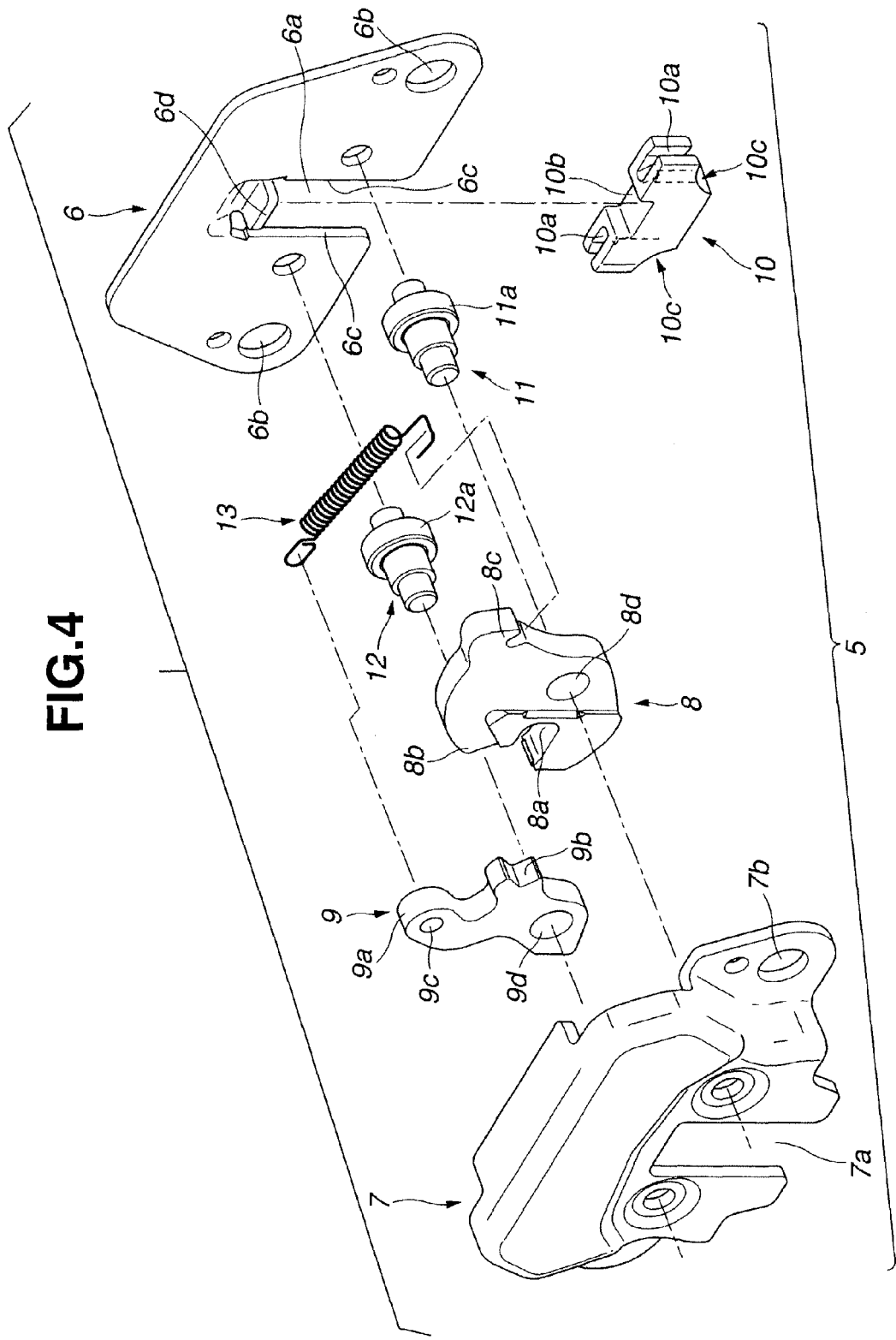
FIG. 4 is an exploded perspective view of the lock device according to the embodiment.

Referring to FIG. 4, a construction of the catcher 5 is explained in detail. As shown in FIG. 4, the catcher 5 includes a base plate 6, a cover 7, a latch 8, a lock plate 9 and a rubber bumper 10. The base plate 6 and the cover 7 cooperate with each other to define an accommodating space in which the latch 8, the lock plate 9 and the rubber bumper 10 are disposed within the accommodating space.

A pair of first striker receiving portions 6a, 7a are formed in the base plate 6 and the cover 7 such that the striker 4 is permitted to move into the first striker receiving portions 6a, 7a and move out therefrom. Specifically, the base plate 6 has a generally trapezoidal shape in front view. The base plate 6 includes one 6a of the pair of first striker receiving portions. The first striker receiving portion 6a is provided in the form of a cutout that extends from a substantially intermediate position on a lower end surface (i.e., one end surface) of the base plate 6 in a width direction extending between left and right sides of the base plate 6, toward an upper end surface of the base plate 6 (i.e., an inside of the base plate 6). The base plate 6 also includes a pair of mounting holes 6b for fixing the catcher 5 to the seat back 1b. The cover 7 includes the other first striker receiving portion 7a, and a pair of mounting holes 7b for fixing the catcher 5 to the seat back 1b. The first striker receiving portion 7a is also provided in the form of a cutout that extends from a substantially intermediate position on a lower end surface (i.e., one end surface) of the cover 7 in a width direction extending between left and right sides of the cover 7, toward an upper end surface of the cover 7 (i.e., an inside of the cover 7). The first striker receiving portion 7a of the cover 7 is formed in a position corresponding to the first striker receiving portion 6a of the base plate 6. The mounting holes 7b are formed in positions corresponding to the mounting holes 6b of the base plate 6, respectively.

Figure 5:
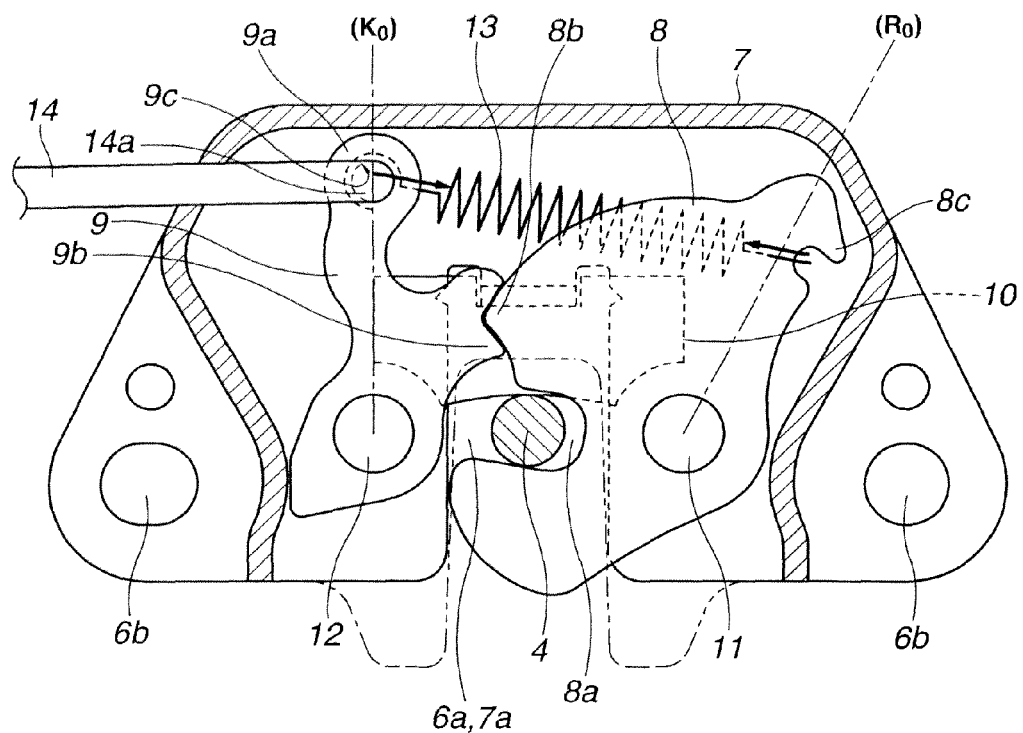
FIG. 5 is an explanatory diagram showing a lock condition of the lock device according to the embodiment.
Figure 7:
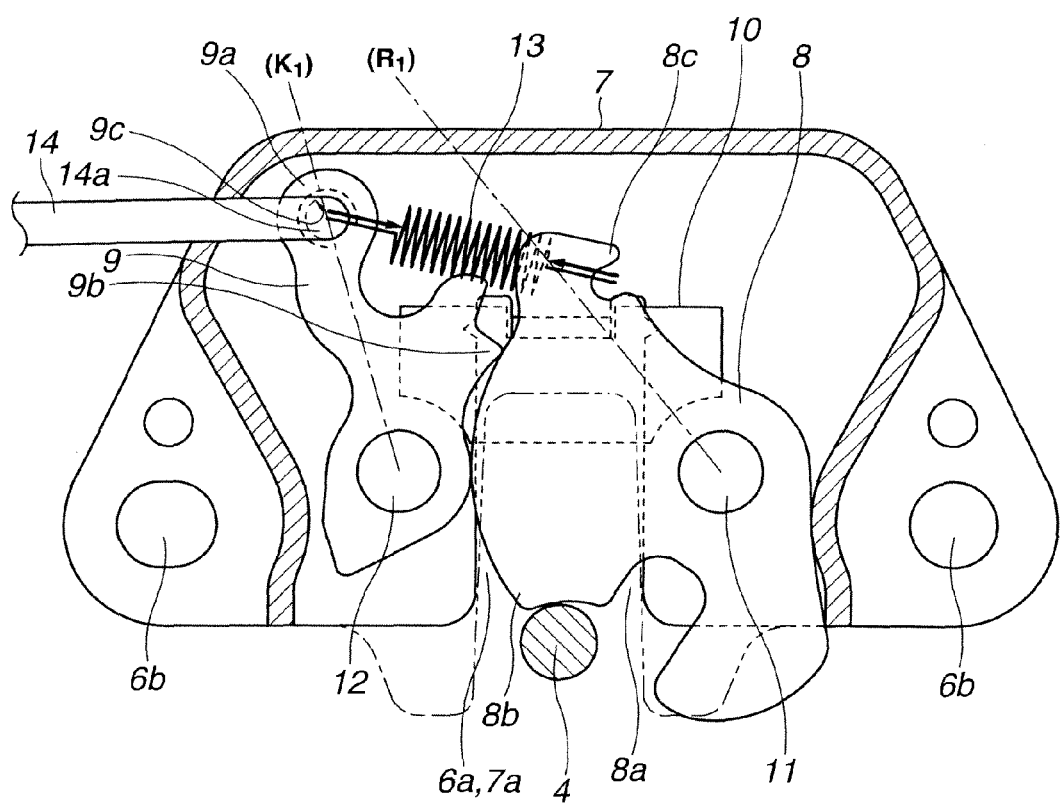
FIG. 7 is an explanatory diagram showing a striker release condition of the lock device according to the embodiment.

As shown in FIG. 4, the latch 8 is rotatably disposed within the accommodating space on a right side of each of the first striker receiving portion 6a of the base plate 6 and the first striker receiving portion 7a of the cover 7 through a latch shaft 11. The latch shaft 11 is inserted into a shaft hole 8d extending through the latch 8. The latch 8 includes a second striker receiving portion 8a configured to permit the striker 4 received in the first striker receiving portions 6a, 7a to move into the second striker receiving portion 8a and move out therefrom. The second striker receiving portion 8a is provided in the form of a cutout or a groove that is opened to an outer peripheral surface of the latch 8. The latch 8 also includes a spring retaining portion 8c that retains one end of a spring (i.e., a biasing member) 13 as explained later. The latch 8 has a lock position in which a straight line extending between the latch shaft 11 and the spring retaining portion 8c is located in a position $R_0$ as shown in FIG. 5, and an unlock position in which the straight line extending between the latch shaft 11 and the spring retaining portion 8c is located in a position $R_1$ as shown in FIG. 7. The latch 8 is rotatably moveable between the lock position (hereinafter referred to as the lock position $R_0$) and the unlock position (hereinafter referred to as the unlock position $R_1$). The lock position $R_0$ is a rotational position in which a part of the latch 8 closes a side of an opening of each of the first striker receiving portions 6a, 7a as shown in FIG. 5. The unlock position $R_1$ is a rotational position in which the part of the latch 8 releases the side of the opening of each of the first striker receiving portions 6a, 7a as shown in FIG. 7.

Figure 6:
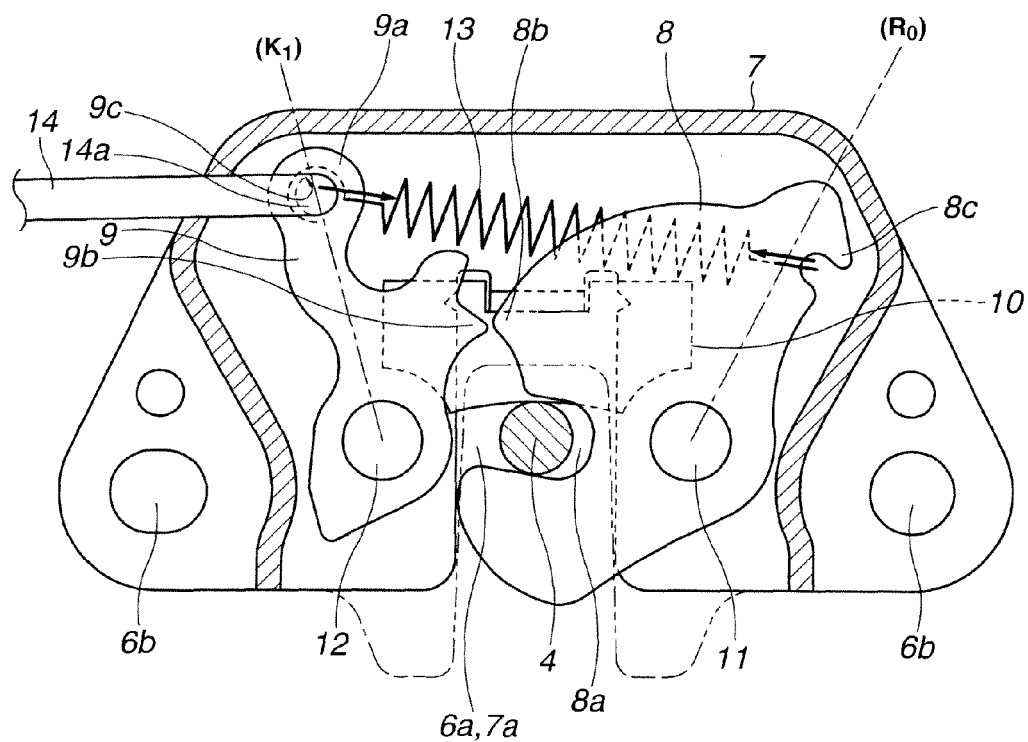
FIG. 6 is an explanatory diagram showing an unlock condition of the lock device according to the embodiment.

On the other hand, the lock plate 9 is rotatably disposed within the accommodating space on a left side of each of the first striker receiving portion 6a of the base plate 6 and the first striker receiving portion 7a of the cover 7 through a lock shaft 12. The lock shaft 12 is inserted into a shaft hole 9d extending through the lock plate 9. The lock plate 9 includes a lock portion 9b that is engageable with an engaging portion 8b of the latch 8 to thereby restrain the latch 8 from rotating from the lock position $R_0$ to the unlock position $R_1$ in a counterclockwise direction as shown in FIG. 5. The lock plate 9 also includes an actuator portion 9a formed with a hole 9c as explained later. The lock plate 9 has a restraint position in which a straight line extending between the lock shaft 12 and the hole 9c is located in a position $K_0$ as shown in FIG. 5, and an allowance position in which the straight line extending between the lock shaft 12 and the hole 9c is located in a position $K_1$ as shown in FIG. 6 and FIG. 7. The lock plate 9 is rotatably moveable between the restraint position (hereinafter referred to as the restraint position $K_0$) and the allowance position (hereinafter referred to as the allowance position $K_1$). In the restraint position $K_0$, the lock plate 9 restrains the latch 8 from rotating from the lock position $R_0$ to the unlock position $R_1$. In the allowance position $K_1$, the lock plate 9 allows the latch 8 to rotate from the lock position $R_0$ to the unlock position $R_1$.

The spring 13 biases the latch 8 to rotate from the lock position $R_0$ toward the unlock position $R_1$ in the counterclockwise direction. The spring 13 also biases the lock plate 9 to rotate from the allowance position $K_1$ toward the restraint position $K_0$ in the clockwise direction. As shown in FIG. 5 to FIG. 7, one end of the spring 13 is hooked on the spring retaining portion 8c, and the other end thereof is hooked on a shaft portion 14a of a release rod 14.

The shaft portion 14a is formed to project from one end portion of the release rod 14, and is received in the hole 9c of the actuator portion 9a of the lock plate 9.

Figure 3A:
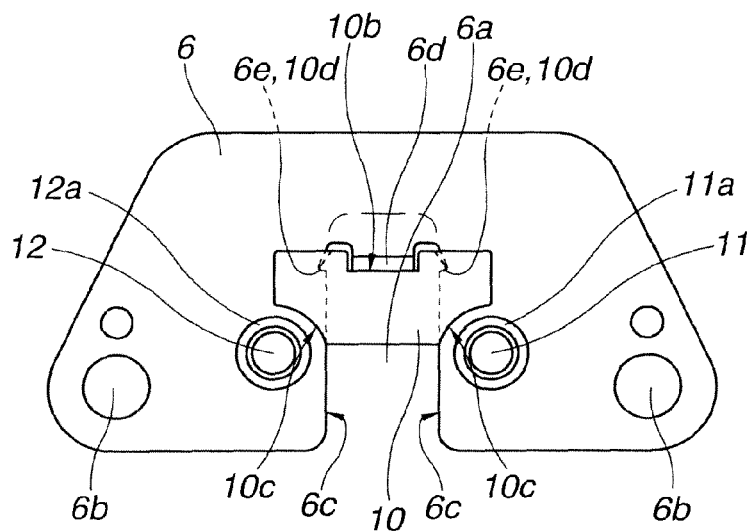
FIG. 3A is a front view of a part of the lock device according to the embodiment, showing an assembly of the base plate, the rubber bumper, a latch shaft and a lock shaft.
Figure 3C:
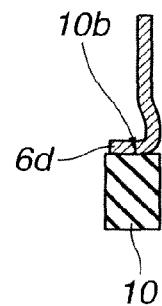
FIG. 3C is an enlarged sectional view of an essential part of the assembly shown in FIG. 3A.
Figure 3B:
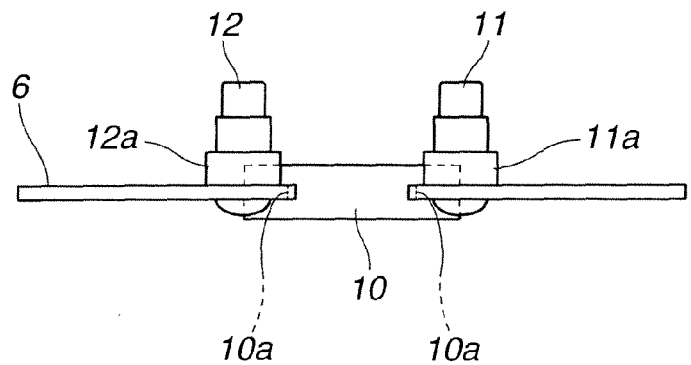
FIG. 3B is a bottom plan view of the assembly shown in FIG. 3A.

The rubber bumper 10 is mounted to the first striker receiving portion 6a of the base plate 6. The rubber bumper 10 serves for reducing an impact that occurs when the striker 4 is allowed to move into the first striker receiving portions 6a of the base plate 6 and the corresponding first striker receiving portion 7a of the cover 7. As shown in FIG. 1A, the rubber bumper 10 has a generally rectangular solid shape having cutout portions 10c, 10c at lower-left and lower-right corner portions thereof. As shown in FIG. 1A to FIG. 1C, the rubber bumper 10 includes engaging grooves 10a, 10a formed on left and right sides of the rubber bumper 10, respectively. As shown in FIG. 3A and FIG. 3B, the engaging grooves 10a, 10a are engaged with opposed side peripheries 6c, 6c of the first striker receiving portion 6a of the base plate 6. As shown in FIG. 1A to FIG. 1C, the engaging grooves 10a, 10a respectively extend from a lower end surface of the rubber bumper 10 to an upper end surface thereof in a direction parallel to a central axis X of the rubber bumper 10 which extends through a midpoint of a distance between left and right side surfaces of the rubber bumper 10 and of a distance between front and rear surfaces of the rubber bumper 10. The engaging grooves 10a, 10a have bottom surfaces that extend substantially parallel to each other.

A recessed portion 10b is formed at one end of the rubber member 10. Specifically, as shown in FIG. 1A, a recessed portion 10b is formed in an intermediate position on the upper end surface of the rubber bumper 10 which is opposed to a bottom surface of the first striker receiving portion 6a of the base plate 6. Fitted to the recessed portion 10b is a bumper receiving portion 6d of the base plate 6 as shown in FIG. 3A and FIG. 3C. As shown in FIG. 2, the bumper receiving portion 6d is formed on the bottom surface of the first striker receiving portion 6a. The bumper receiving portion 6d extends from the bottom surface of the first striker receiving portion 6a into the first striker receiving portion 6a and then extends into the accommodating space between the base plate 6 and the cover 7 in a direction perpendicular to the base plate 6 as shown in FIG. 3C. The bumper receiving portion 6d is formed by bending a portion of the base plate 6 which is cut upon forming the first striker receiving portion 6a, toward the accommodating space in the direction perpendicular to the base plate 6.

The rubber bumper 10 also includes restraining portions (i.e., the cutout portions) 10c, 10c for restraining the rubber bumper 10 from falling off from the first striker receiving portion 6a. The restraining portions 10c, 10c are formed on the both sides (i.e., the left and right sides) of the rubber bumper 10 at the other end (i.e., the lower end) of the rubber bumper 10. The restraining portions 10c, 10c are located on the side of the opening of the first striker receiving portion 6a. The restraining portions 10c, 10c are engageable with a boss portion 11a of the latch shaft 11 and a boss portion 12a of the lock shaft 12, thereby restraining the rubber bumper 10 from falling off from the first striker receiving portion 6a. The respective restraining portions 10c, 10c are provided in the form of a recessed portion having an arcuate shape that is configured to correspond to an outer circumferential surface of the respective boss portions 11a, 12a and be engageable with the outer circumferential surface thereof.

Further, as shown in FIG. 2, the base plate 6 includes a pair of recesses 6e, 6e disposed in the opposed side peripheries 6c, 6c of the first striker receiving portion 6a in the vicinity of the bottom surface of the first striker receiving portion 6a. The recesses 6e, 6e are disposed to be opposed to both sides of the bumper receiving portion 6d, and spaced from the bumper receiving portion 6d and the bottom surface of the first striker receiving portion 6a. On the other hand, as shown in FIG. 1A to FIG. 1C, the rubber bumper 10 includes a pair of projections 10d, 10d that extend from the bottom surfaces of the engaging grooves 10a, 10a in opposite directions perpendicular to the axial direction of the rubber bumper 10. As shown in FIG. 3A, the projections 10d, 10d are engaged with the recesses 6e, 6e of the base plate 6, respectively. The rubber bumper 10 is fixed to the bottom of the first striker receiving portion 6a by the engagement between the projections 10d, 10d and the recesses 6e, 6e.

[Operation]

Next, an operation of the lock device according to the embodiment is explained.

As shown in FIG. 5, when the latch 8 is located in the lock position $R_0$ and the lock plate 9 is located in the restraint position $K_0$, the engaging portion 8b of the latch 8 and the lock portion 9b of the lock plate 9 are engaged with each other. In this condition, the latch 8 is urged toward the unlock position $R_1$ shown in FIG. 7, as indicated by a leftward arrow shown in FIG. 5, and at the same time, the lock plate 9 is urged toward the restraint position $K_0$ as indicated by a rightward arrow shown in FIG. 5, by the biasing force of the spring 13. The striker 4 is sandwiched between an inner peripheral surface of the second striker receiving portion 8a of the latch 8 and the lower end surface of the rubber bumper 10, thereby being restrained within the first striker receiving portion 6a of the base plate 6 and the first striker receiving portion 7a of the cover 7.

Next, when the actuator portion 9a of the lock plate 9 is moved leftward against the biasing force of the spring 13 by manipulating the release rod 14, the lock plate 9 is rotationally moved from the restraint position $K_0$ to the allowance position $K_1$ in the counterclockwise direction as shown in FIG. 6. In this condition, the engaging portion 8b of the latch 8 and the lock portion 9b of the lock plate 9 are brought into disengagement from each other. Subsequently, the latch 8 is rotationally moved to the unlock position $R_1$ shown in FIG. 7 in the counterclockwise direction by the biasing force of the spring 13. As a result, the striker 4 is allowed to move out from the second striker receiving portion 8a and the first striker receiving portions 6a, 7a. The striker 4 is thus released from the catcher 5.

Upon assembling the catcher 5, the rubber bumper 10 is mounted to the first striker receiving portion 6a of the base plate 6 as follows. First, the opposed side peripheries 6c, 6c of the first striker receiving portion 6a are inserted into the engaging grooves 10a, 10a of the rubber bumper 10 such that the rubber bumper 10 is pushed into the first striker receiving portion 6a. Subsequently, the projections 10d, 10d of the rubber bumper 10 are engaged with recesses 6e, 6e of the opposed side peripheries 6c, 6c of the first striker receiving portion 6a. At this time, as shown in FIG. 3C, the bumper receiving portion 6d of the base plate 6 is brought into engagement with the recessed portion 10b of the rubber bumper 10. Next, the latch shaft 11 and the lock shaft 12 are mounted to the base plate 6. In the thus assembled state as shown in FIG. 3A, downward displacement of the rubber bumper 10 can be restricted by engagement between the respective restraining portions 10c, 10c and the boss portion 11a of the latch shaft 11 and the boss portion 12a of the lock shaft 12, so that fall-off of the rubber bumper 10 from the first striker receiving portion 6a can be restrained.

[Effects]

The above-described lock device for a vehicular seat, according to the embodiment of the present invention can attain the following effects. Displacement of the rubber bumper 10 in a length direction of the first striker receiving portion 6a of the base plate 6 (i.e., in the axial direction of the rubber bumper 10) can be restricted by the engagement between the bumper receiving portion 6d of the base plate 6 and the recessed portion 10b of the rubber bumper 10 and the engagement between the boss portions 11a, 12a of the respective shafts 11, 12 and the restraining portions 10c, 10c of the rubber bumper 10.

Further, an inclining movement of the rubber bumper 10 with respect to an axial direction of the striker 4 can be restrained by the engagement between the side peripheries 6c, 6c of the first striker receiving portion 6a of the base plate 6 and the engaging grooves 10a, 10a of the rubber bumper 10. With this construction, the rubber bumper 10 can be formed into a simple shape. Further, the rubber bumper 10 has a line symmetrical shape with respect to the central axis of the rubber bumper 10 as shown in FIG. 1A and FIG. 1C. Owing to the symmetrical shape of the rubber bumper 10, an operation of assembling the lock device can be performed without taking into account an assembling direction of the rubber bumper 10. Therefore, an efficiency in the assembling operation of the lock device can be enhanced.

Further, when the rubber bumper 10 is pushed into the first striker receiving portion 6a of the base plate 6 by inserting the side peripheries 6c, 6c of the first striker receiving portion 6a of the base plate 6 into the engaging grooves 10a, 10a of the rubber bumper 10, the recesses 6e, 6e of the side peripheries 6c, 6c are engaged with the projections 10d, 10d of the rubber bumper 10, so that the rubber bumper 10 is fixed to the bottom of the first striker receiving portion 6a of the base plate 6.

Furthermore, the rubber bumper 10 is fixed to the bottom of the first striker receiving portion 6a of the base plate 6 by engaging the recesses 6e, 6e of the side peripheries 6c, 6c of the first striker receiving portion 6a with the projections 10d, 10d of the rubber bumper 10. With this construction, when the striker 4 is allowed to move into the first striker receiving portion 6a of the base plate 6 and the first striker receiving portion 7a of the cover 7 and then contact with the lower end surface of the rubber bumper 10, the striker 4 can be stably received by the rubber bumper 10 in the first striker receiving portion 6a, and an impact that is caused between the striker 4 and the bottom of the first striker receiving portion 6a can be reduced by the rubber bumper 10.

Meanwhile, in the above-described lock device according to the embodiment of the present invention, the projections 10d, 10d are formed in the rubber bumper 10, and the recesses 6e, 6e are formed in the base plate 6. However, the arrangement of the projections and the recesses is not limited to this embodiment. The projections can be formed in the base plate, and the recessed portions can be formed in the rubber bumper.

This application is based on a prior Japanese Patent Application No. 2011-17701 filed on Jan. 31, 2011. The entire contents of the Japanese Patent Application No. 2011-17701 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A lock device for a vehicular seat, comprising:
   a striker fixed to a vehicle body; and
   a catcher disposed on the seat, the catcher catching the striker,
   the catcher comprising:
   a base plate;
   a cover cooperating with the base plate to form an accommodating space therebetween;
   a first striker receiving portion formed in each of the base plate and the cover such that the striker is permitted to move into and move out from the first striker receiving portion, the first striker receiving portion extending from a substantially intermediate position on one end surface of each of the base plate and the cover toward an inside of each of the base plate and the cover,
   a latch rotatably disposed within the accommodating space on one side of the first striker receiving portion through a latch shaft, the latch having a lock position with respect to the striker and an unlock position with respect to the striker,
   a second striker receiving portion formed in the latch such that the striker received in the first striker receiving portion is permitted to move into and move out from the second striker receiving portion,
   a lock plate rotatably disposed within the accommodating space on the other side of the first striker receiving portion through a lock shaft, the lock plate having a restraint position in which the lock plate restrains the latch from rotating from the lock position to the unlock position and an allowance position in which the lock plate allows the latch to rotate from the lock position to the unlock position, and
   a rubber bumper mounted to the first striker receiving portion formed in the base plate, the rubber bumper serving for reducing an impact that occurs when the striker is allowed to move into the first striker receiving portion, wherein the rubber bumper comprises:
engaging grooves formed on both sides of the rubber bumper, the engaging grooves being engaged with side peripheries of the first striker receiving portion formed in the base plate, respectively,
a recessed portion formed at one end of the rubber bumper which is opposed to a bottom surface of the first striker receiving portion formed in the base plate, the recessed portion being engaged with a bumper receiving portion formed on the bottom surface of the first striker receiving portion formed in the base plate, and
restraining portions formed on the both sides of the rubber bumper at the other end of the rubber bumper which is located on a side of an opening of the first striker receiving portion formed in the base plate, the restraining portions being engageable with an outer circumferential surface of the latch shaft and an outer circumferential surface of the lock shaft, thereby restraining the rubber bumper from falling off from the first striker receiving portion formed in the base plate.

2. The lock device for a vehicular seat as claimed in claim 1, wherein the first striker receiving portion formed in the base plate comprises one of a recess and a projection, the one of the recess and the projection being formed on each of the side peripheries of the first striker receiving portion formed in the base plate in the vicinity of the bottom surface of the first striker receiving portion formed in the base plate, and the rubber bumper comprises the other of the recess and the projection, the other of the recess and the projection being formed on a bottom surface of each of the engaging grooves formed on the rubber member, the one of the recess and the projection and the other thereof being engaged with each other to fix the rubber bumper into the first striker receiving portion formed in the base plate.

3. The lock device for a vehicular seat as claimed in claim 1, wherein the engaging grooves of the rubber bumper have bottom surfaces that extend substantially parallel to each other.

4. The lock device for a vehicular seat as claimed in claim 1, wherein the bumper receiving portion of the base plate extends from the bottom surface of the first striker receiving portion formed in the base plate into the first striker receiving portion formed in the base plate, and then extends into the accommodating space between the base plate and the cover in a direction perpendicular to the base plate.

5. The lock device for a vehicular seat as claimed in claim 1, wherein the rubber bumper has a line symmetrical shape with respect to a central axis of the rubber bumper.

* * * * *